(12) United States Patent
Nightingale et al.

(10) Patent No.: US 9,298,438 B2
(45) Date of Patent: Mar. 29, 2016

(54) PROFILING APPLICATION CODE TO IDENTIFY CODE PORTIONS FOR FPGA IMPLEMENTATION

(75) Inventors: Edmund B. Nightingale, Redmond, WA (US); Brian A. LaMacchia, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 13/528,251

(22) Filed: Jun. 20, 2012

(65) Prior Publication Data

US 2013/0346979 A1  Dec. 26, 2013

(51) Int. Cl.
| | |
|---|---|
| G06F 9/46 | (2006.01) |
| G06F 9/45 | (2006.01) |
| G06F 17/50 | (2006.01) |
| G06F 9/44 | (2006.01) |
| G06F 9/445 | (2006.01) |
| G06F 21/76 | (2013.01) |

(52) U.S. Cl.
CPC ........... *G06F 8/456* (2013.01); *G06F 8/54* (2013.01); *G06F 9/44* (2013.01); *G06F 17/50* (2013.01); *G06F 17/505* (2013.01); *G06F 17/5027* (2013.01); *G06F 17/5054* (2013.01); *G06F 21/76* (2013.01)

(58) Field of Classification Search
None
See application file for complete search history.

(56) References Cited

U.S. PATENT DOCUMENTS

| | | | |
|---|---|---|---|
| 5,748,979 A * | 5/1998 | Trimberger | 712/37 |
| 5,752,035 A * | 5/1998 | Trimberger | 717/153 |
| 5,915,025 A | 6/1999 | Taguchi et al. | |
| 6,557,156 B1 * | 4/2003 | Guccione | 716/117 |
| 6,704,816 B1 * | 3/2004 | Burke | 710/100 |
| 6,823,069 B1 * | 11/2004 | Kitajima | H04L 9/0625 380/44 |
| 6,907,126 B2 | 6/2005 | Inada | |
| 6,941,538 B2 * | 9/2005 | Hwang et al. | 716/102 |
| 7,028,283 B1 * | 4/2006 | Keller et al. | 716/117 |
| 7,134,025 B1 | 11/2006 | Trimberger | |

(Continued)

FOREIGN PATENT DOCUMENTS

| | | |
|---|---|---|
| CN | 1284681 | 2/2001 |
| CN | 2650231 | 10/2004 |

(Continued)

OTHER PUBLICATIONS

Frigo et al.; "Evaluation of the Streams-C C-to-FPGA Compiler: An Applications Perspective", Feb. 13, 2001, Copyright 2001 ACM, (Frigo_2001.pdf; pp. 1-7).*

(Continued)

*Primary Examiner* — Hiren Patel
(74) *Attorney, Agent, or Firm* — Aneesh Mehta; Ramesh Kuchibhatla; Micky Minhas

(57) ABSTRACT

Application code is analyzed to determine if a hardware library could accelerate its execution. In particular, application code can be analyzed to identify calls to application programming interfaces (APIs) or other functions that have a hardware library implementation. The code can be analyzed to identify the frequency of such calls. Information from the hardware library can indicate characteristics of the library, such as its size, power consumption and FPGA resource usage. Information about the execution pattern of the application code also can be useful. This information, along with information about other concurrent processes using the FPGA resources, can be used to select a hardware library to implement functions called in the application code.

12 Claims, 6 Drawing Sheets

(56) References Cited

U.S. PATENT DOCUMENTS

| | | | |
|---|---|---|---|
| 7,512,813 B2* | 3/2009 | Goodnow | G06F 21/76 380/42 |
| 7,587,699 B2* | 9/2009 | McCubbrey | 716/104 |
| 7,669,168 B1* | 2/2010 | Patterson | 716/50 |
| 7,702,927 B2 | 4/2010 | Devadas et al. | |
| 7,711,964 B2 | 5/2010 | Van Essen et al. | |
| 7,788,502 B1 | 8/2010 | Donlin et al. | |
| 8,065,517 B2 | 11/2011 | Cizas et al. | |
| 8,230,374 B2* | 7/2012 | McCubbrey | G06F 17/5054 716/101 |
| 8,369,460 B1* | 2/2013 | Su | 375/340 |
| 8,417,965 B1 | 4/2013 | Sundararajan et al. | |
| 8,448,122 B1* | 5/2013 | Suthar et al. | 716/128 |
| 8,516,268 B2 | 8/2013 | Woodall | |
| 2001/0037457 A1 | 11/2001 | Inada | |
| 2001/0043082 A1 | 11/2001 | Wittig et al. | |
| 2002/0055947 A1* | 5/2002 | Schultz | G06F 8/34 715/209 |
| 2003/0086300 A1* | 5/2003 | Noyes et al. | 365/189.01 |
| 2003/0110463 A1* | 6/2003 | Kuhlmann et al. | 716/17 |
| 2003/0172303 A1 | 9/2003 | Adusumilli | |
| 2004/0019765 A1 | 1/2004 | Klein, Jr. | |
| 2004/0049672 A1* | 3/2004 | Nollet et al. | 713/100 |
| 2004/0060032 A1* | 3/2004 | McCubbrey | 716/16 |
| 2004/0123258 A1* | 6/2004 | Butts | 716/5 |
| 2004/0230934 A1* | 11/2004 | Taylor | G06F 17/5027 326/38 |
| 2006/0015313 A1* | 1/2006 | Wang et al. | 703/14 |
| 2006/0015862 A1* | 1/2006 | Odom et al. | 717/168 |
| 2006/0059373 A1 | 3/2006 | Fayad et al. | |
| 2006/0156406 A1 | 7/2006 | Bantz et al. | |
| 2007/0074045 A1 | 3/2007 | Van Essen et al. | |
| 2007/0129818 A1* | 6/2007 | Andrade et al. | 700/18 |
| 2007/0277161 A1* | 11/2007 | Herbordt et al. | 717/140 |
| 2008/0104601 A1* | 5/2008 | Kaneko et al. | 718/103 |
| 2008/0133899 A1 | 6/2008 | Park et al. | |
| 2009/0119503 A1 | 5/2009 | Isaakian et al. | |
| 2009/0282386 A1* | 11/2009 | Moir et al. | 717/106 |
| 2009/0288076 A1 | 11/2009 | Johnson et al. | |
| 2009/0293051 A1 | 11/2009 | Krywaniuk | |
| 2010/0202239 A1 | 8/2010 | Moshayedi et al. | |
| 2010/0293356 A1* | 11/2010 | Plunkett et al. | 712/15 |
| 2011/0145780 A1* | 6/2011 | Chen | 716/137 |
| 2011/0153981 A1 | 6/2011 | Yancey et al. | |
| 2012/0047371 A1 | 2/2012 | Woodall | |
| 2012/0117549 A1* | 5/2012 | Doyle et al. | 717/147 |
| 2012/0191967 A1 | 7/2012 | Lin et al. | |
| 2013/0346669 A1* | 12/2013 | Nightingale et al. | 711/103 |
| 2013/0346758 A1* | 12/2013 | LaMacchia et al. | 713/190 |
| 2013/0346759 A1* | 12/2013 | LaMacchia et al. | 713/190 |
| 2013/0346985 A1* | 12/2013 | Nightingale | 718/102 |

FOREIGN PATENT DOCUMENTS

| | | |
|---|---|---|
| CN | 101222743 | 7/2008 |
| CN | 201371945 | 12/2009 |
| CN | 102087600 | 6/2011 |
| CN | 102119390 | 7/2011 |
| CN | 102324006 | 1/2012 |
| CN | 102377564 | 3/2012 |
| EP | 1930834 A1 | 6/2008 |

OTHER PUBLICATIONS

Huang et al.; "Function-Level Multitasking Interface Design in an Embedded OS with Reconfigurable Hardware", IFIP International Federation for imformation processing 2007, Yuan Ze University, Taiwan. (Huang_2007.pdf; pp. 1-10).*

Lysecky et al.; "Dynamic FPGA Routing for Just-in-Time FPGA compilation" University of California, Jun. 11, 2004; (Lysecky_2004.pdf; pp. 1-6).*

David Max Meisner; "Design of a shared hardware library for multi-core environments in FPGA fabrics", Honor Thesis busmitted to Brown University, Apr. 24, 2007; (Meisner_2007.pdf; pp. 1-48).*

Shibamura et al.; "A Dyanamically Reconfigurable Platform using Embedded Processor FPGA", Kumamoto University, Japan, Copyright 2004 IEEE (Shibamura_2004.pdf; pp. 1-8).*

Jain et al. "Speeding Up Program Execution Using Reconfigurable Hardware and a Hardware Function Library", IEEE 1997, (Jain_1997.pdf; pp. 1-6).*

Notice of Allowance dated Jul. 29, 2014 cited in U.S. Appl. No. 13/528,438.

Marescaux, et al., "Run-Time Support for Heterogeneous Multitasking on Reconfigurable SoCs", In Integration, the VLSI Journal—Special Issue: Networks on Chip and Reconfigurable Fabrics, vol. 38, Issue 1, Oct. 2004, 24 pages.

Vuletic, et al., "Seamless Hardware-Software Integration in Reconfigurable Computing Systems", In IEEE Design & Test of Computers, vol. 22, Issue 2, Mar. 2005, 12 pages.

"International Search Report & Written Opinion for PCT Patent Application No. PCT/US2013/046418", Mailed Date: Sep. 11, 2013, Filed Date: Jun. 18, 2013, 11 pages.

"International Search Report & Written Opinion for PCT Patent Application No. PCT/US2013/046719", Mailed Date: Sep. 11, 2013, Filed Date: Jun. 20, 2013, 10 pages.

"International Search Report & Written Opinion for PCT patent Application No. PCT/US2013/046881", Mailed Date: Nov. 29, 2013, Filed Date: Jun. 20, 2013, 9 pages.

"International Search Report & Written Opinion for PCT Patent Application No. PCT/US2013/046871", Mailed Date: Oct. 15, 2013, Filed Date: Jun. 20, 2013, 9 pages.

U.S. Appl. No. 13/528,175, filed Apr. 11, 2014, Office Action.
U.S. Appl. No. 13/528,329, filed Oct. 16, 2013, Office Action.
U.S. Appl. No. 13/528,400, filed Sep. 13, 2013, Office Action.
U.S. Appl. No. 13/528,400, filed Jun. 16, 2014, Office Action.
U.S. Appl. No. 13/528,438, filed Sep. 16, 2013, Office Action.
U.S. Appl. No. 13/528,438, Apr. 16, 2014, Notice of Allowance.

Office Action dated Aug. 15, 2014 cited in U.S. Appl. No. 13/528,329.

Office Action dated Nov. 7, 2014 cited in U.S. Appl. No. 13/5289,400.

Office Action dated Oct. 17, 2014 cited in U.S. Appl. No. 13/528,175.
Office Action dated Feb. 13, 2015 cited in U.S. Appl. No. 13/528,175.
Office Action dated Feb. 23, 2015 cited in U.S. Appl. No. 13/528,329.

"First Office Action Issued in Chinese Patent Application No. 201310248192.3, Mailed Date: Oct. 10, 2015, 14 Pages."

Notice of Allowance dated Aug. 31, 2015 cited in U.S. Appl. No. 13/528,400.

Notice of Allowance dated May 13, 2015 cited in U.S. Appl. No. 13/528,400.

Office Action dated Jun. 4, 2015 cited in U.S. Appl. No. 13/528,329.
Office Action dated Oct. 26, 2015 U.S. Appl. No. 13/528,175.
Notice of Allowance dated Nov. 16, 2015 U.S. Appl. No. 13/528,329.

First Office Action Received in Chinese Patent Application No. 201310245064.3, Mailed Date: Dec. 24, 2015, 14 Pages.

"First Office Action and Search Report Issued in Chinese Patent Application No. 201310248194.2", Mailed Date: Jan. 13, 2016, 13 Pages.

* cited by examiner

US 9,298,438 B2

PROFILING APPLICATION CODE TO IDENTIFY CODE PORTIONS FOR FPGA IMPLEMENTATION

BACKGROUND

In most general purpose computers, an operating system is the primary software that manages access to resources within the computer. The primary resources are the central processing unit (CPU), which executes application programs designed to run on the computer, main memory and storage. In some computer architectures, additional processing units (such as multiple cores in a processor) and/or additional processors, called co-processors, may be present. Examples of such co-processors include a graphic processing unit (GPU) and a digital signal processor (DSP). The operating system also manages access to these resources by multiple processes.

A field programmable gate array (FPGA) is a kind of logic device that is commonly used in specialized computing devices. An FPGA typically is used to perform a specific, dedicated function, for which a gate array is particularly well-suited. FPGAs typically are found in peripheral devices, or other specialized hardware, such as a printed circuit board connected to and accessed through a system bus such as a PCI bus. In general, such devices are programmed once, and used many times. Because these devices are programmable, they have an advantage over other specialized logic devices in that they can be updated in the field.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One or more field programmable gate arrays (FPGA) can be used as a shared programmable co-processor resource in a general purpose computing system. An FPGA can be programmed to perform functions, which in turn can be associated with one or more processes. With multiple processes, the FPGA can be shared, and a process is assigned to at least one portion of the FPGA during a time slot in which to access the FPGA. Programs written in a hardware description language for programming the FPGA are made available as a hardware library. The operating system manages allocating the FPGA resources to processes, programming the FPGA in accordance with the functions to be performed by the processes using the FPGA, and scheduling use of the FPGA by these processes.

The use of a hardware library by an application can be explicit or the application code can be analyzed to determine if a hardware library could accelerate its execution. In particular, application code can be analyzed to identify calls to application programming interfaces (APIs) or other functions that have a hardware library implementation. The code can be analyzed to identify the frequency of such calls. Information from the hardware library can indicate characteristics of the library, such as its size, power consumption and FPGA resource usage. Information about the execution pattern of the application code also can be useful. This information, along with information about other concurrent processes using the FPGA resources, can be used to select a hardware library to implement functions called in the application code.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides a brief, general description of an example computing environment in which an operating system for managing use of FPGA resources can be implemented. The system can be implemented with numerous general purpose or special purpose computing devices. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 1:
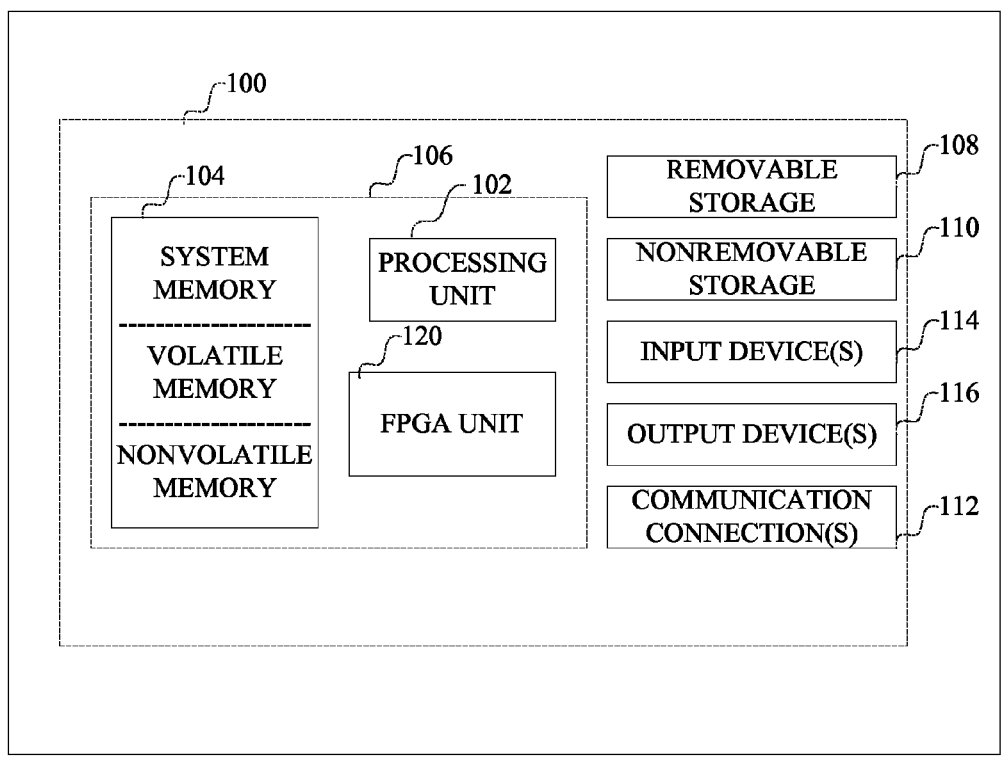
FIG. 1 is a block diagram of an example computing system with FPGA resources for which an operating system can be implemented.

FIG. 1 illustrates merely an example computing environment, and is not intended to suggest any limitation as to the scope of use or functionality of a suitable computing environment.

With reference to FIG. 1, an example computing environment includes a computing device 100. In a basic configuration, computing device 100 includes at least one processing unit 102, such as a typical central processing unit (CPU) of a general purpose computer, and memory 104.

The computing device may include multiple processing units and/or additional co-processing units such as a graphics processing unit (GPU). The computing device also includes one or more field programmable gate arrays (FPGA), denoted as FPGA unit 120 which is available as a shared (among processes running on the computer) co-processing resource. An FPGA may reside in its own CPU socket or on a separate card plugged into an expansion slot, such as a Peripheral Component Interconnect Express (PCI-E) slot. By providing such an FPGA unit, a variety of functions that are well-suited for implementation by a gate array can be implemented with the resulting benefit of hardware acceleration.

Depending on the configuration of the processing unit and the FPGA unit, the unit, or each functional unit within it, has an associated input/output channel for communication with host operating system processes. For example, a memory region dedicated to the functional unit and shared between it and a process using that functional unit can be provided. A sort of request queue and response queue also can be used to enable asynchronous invocation of operations implemented in the FPGA unit. Additionally, state of the functional units in the FPGA unit for a process can be saved to and restored from a memory region for the functional unit and that process. Alternatively other techniques can be used to ensure that the functional unit is in a known state before it is used by its process.

Depending on the configuration and type of computing device, memory 104 may be volatile (such as RAM), nonvolatile (such as ROM, flash memory, etc.) or some combination of the two. This configuration of a processing unit, co-processor and memory is illustrated in FIG. 1 by dashed line 106.

Computing device 100 may also have additional resources and devices. For example, computing device 100 may include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data files, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 also can include communications connection(s) 112 that allow the device to communicate with other devices over a communication medium. The implementation of the communications connection 112 is dependent on the kind of communication medium being accessed by the computing device, as it provides an interface to such a medium to permit transmission and/or reception of data over the communication medium. A communication medium typically carries computer program instructions, data files, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing device 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here.

Applications executed on a computing device are implemented using computer-executable instructions and/or computer-interpreted instructions, such as program modules, that are processed by the computing device. Generally, program modules include routines, programs, objects, components, data structures, and so on, that, when processed by a processing unit, instruct the processing unit to perform particular tasks or implement particular abstract data types. In a distributed computing environment, such tasks can be performed by remote processing devices that are linked through a communications network. In a distributed computing environment, program modules may be located in both local and remote computer storage media including memory storage devices.

An operating system executed on a computing device manages access to the various resources of the computer device by processes. Typically, running an application on the computer system causes one or more processes to be created, with each process being allocated to different resources over time. If a resource is shared among processes, and if the processes cannot share the resource concurrently, then the operating system schedules access to the resource over time. One of such resources is the FPGA unit 120 of FIG. 1, which can include one or more discrete FPGA's.

Figure 2:
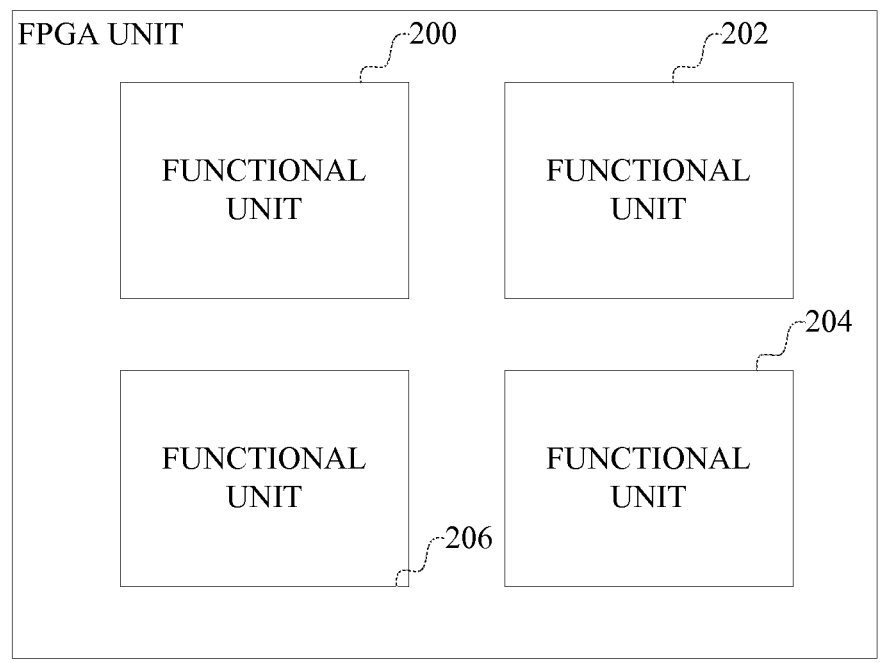
FIG. 2 is a schematic diagram of an illustrative example of FPGA functional units.
Figure 3:
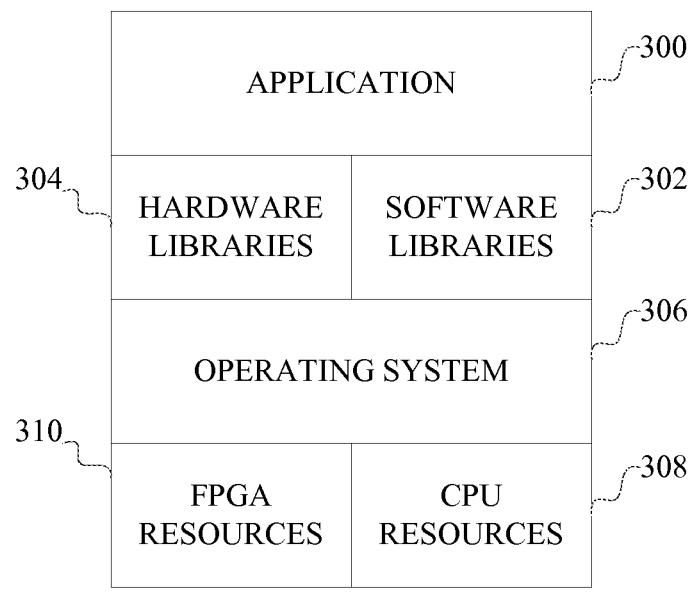
FIG. 3 is a schematic diagram of an example architecture of an application using hardware and software libraries on a computer system with FPGA resources.

Referring to FIG. 2, one of the resources within the FPGA unit is one or more groups of programmable gates, herein called functional units. Each functional unit is defined by a set of gates and/or other resources in the gate array. In general, functional units are nonoverlapping, i.e., do not share programmable elements within the gate array. For example, as illustrated schematically in FIG. 2, functional units 200, 202, 204 and 206 are non-overlapping. Most FPGAs have only one functional unit. The FPGA unit 120 in FIG. 1, however, can have one or more FPGAs. With multiple FPGAs, each FPGA can be considered a functional unit. Referring to FIG. 3, each functional unit is a resource that can be assigned to one or more processes, programmed by the operating system using a hardware library that implements an operation, and then used by the processes assigned to it to perform the operation. Referring to FIG. 3 as an example, an application 300 can use conventional software libraries 302, and FPGA hardware libraries 304, to perform various operations. If an application relies on a hardware library 304, then the operating system 306 uses the hardware library to program the FPGA resources 310 to allow the application 300 to use the library. The FPGA can be programmed prior to the application beginning execution. If an FPGA can be reprogrammed quickly enough, the library can be loaded into the FPGA in a scheduling quantum of the operating system. The operating system 306 also executes software commands from the application 300 and software libraries 302 on the CPU 308. When the application makes calls to functions performed by a software library, the operating system executes the function from the software library on the CPU 308. When the application makes calls to functions performed by the FPGA, the operating system ensures that the FPGA is programmed using the hardware library and executes the function using the FPGA.

Figure 4:
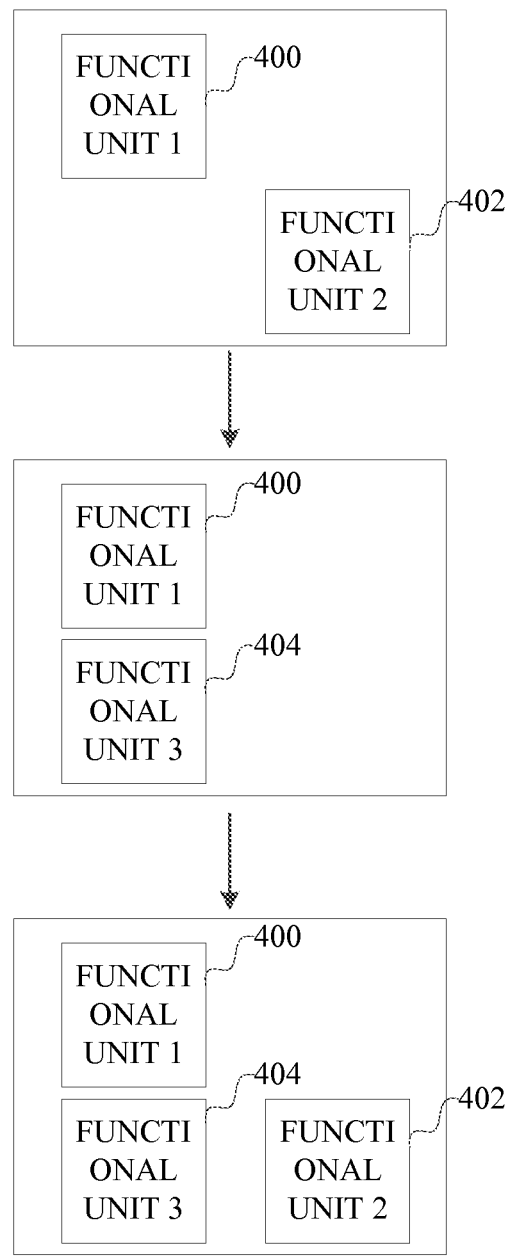
FIG. 4 is a diagram illustrating the use of FPGA resources over time.

To illustrate how different functional units can be used over time, reference is now made to FIG. 4. In FIG. 4, at time T1, functional units 400 and 402 are being used. At time T2, functional units 400 and 404 are being used. At time T3, functional units 400 and 402 are again being used. At time T1, functional unit 400 can be assigned to process P1, and functional unit 402 can be assigned to process P2. At time T2, process P2 may be inactive, and process P1 can use functional unit 400 and process P3 can use functional unit 404. At time T3, another process can start using functional unit 400, such as process P4; and process P2 can be active again at use functional unit 402. With current FPGA implementations, the use of multiple functional units at the same time by different processes implies the use of multiple FPGAs. To the extent that an FPGA can support multiple functional units being used by different processes at the same time, these functional units can be on the same FPGA. Effectively, the operating system is statistically multiplexing the FPGA in both time and space.

To allow such usage of the FPGA resources by different processes over time, the operating system has a scheduler that determines which process has access to the FPGA resources at each scheduling quantum, i.e., time period, and when an FPGA functional unit will be programmed with a hardware library so that the functional unit is available to be used by that process. Thus, an implementation of a scheduler for the FPGA unit is dependent in part on the nature of the FPGA unit and the one or more FPGAs it includes. Factors related to the FPGAs to be considered include, but are not limited to, the following. For example, in some cases an entire FPGA is refreshed to program a functional unit if one functional unit cannot be programmed independently of other functional units. Another consideration is the speed with which a functional unit can be programmed, and whether programming of a functional unit prevents other functional units from being used during that programming phase. Another factor to consider is whether processes can share a hardware library by sharing a functional unit. The scheduler also takes into account such factors as the number of concurrent processes, application performance guarantees, priority of applications, process context switching costs, access to memory and buses, and availability of software libraries if no functional unit is available within the FPGA unit.

There may be other instances where the FPGA unit provides a general purpose facility to applications or the operating system, which therefore are scheduled for the length of an application instantiation. For example, custom network protocols or offloading can be offered as an accelerated service on the FPGA unit. System calls or standard library calls, normally executed in a general purpose CPU, can be accelerated using the FPGA unit instead. Further, the operating system can multiplex the CPU based on preferences for process priority. In another instance, the operating system can use a profile of an application, generated statically or dynamically, to predict the functionality best suited for running on an FPGA unit and then pre-load that functionality so that it is available for scheduling. By using the profile as a guide, the operating system can ensure there is both space and time available on the FPGA unit to accelerate the application. Finally, the operating system can use simple hints from the application to know when to schedule time on the FPGA unit. For example, certain calls into the operating system (system calls) can denote long delays (calls to disk or the network), which provides a hint that the FPGA unit can be free for some amount of time for other threads or processes to use. Therefore, the operating system uses a variety of hints and preferences to create a schedule to multiplex access to the FPGA unit. Because the operating system controls the scheduler, it has detailed knowledge of executing and pending work, available hardware libraries, and time it takes to program an FPGA. Therefore, it can use this knowledge to determine which processes leverage the FPGA during execution.

Having now described a general overview of such computer architecture, an example implementation of code profiling will now be described.

Figure 5:
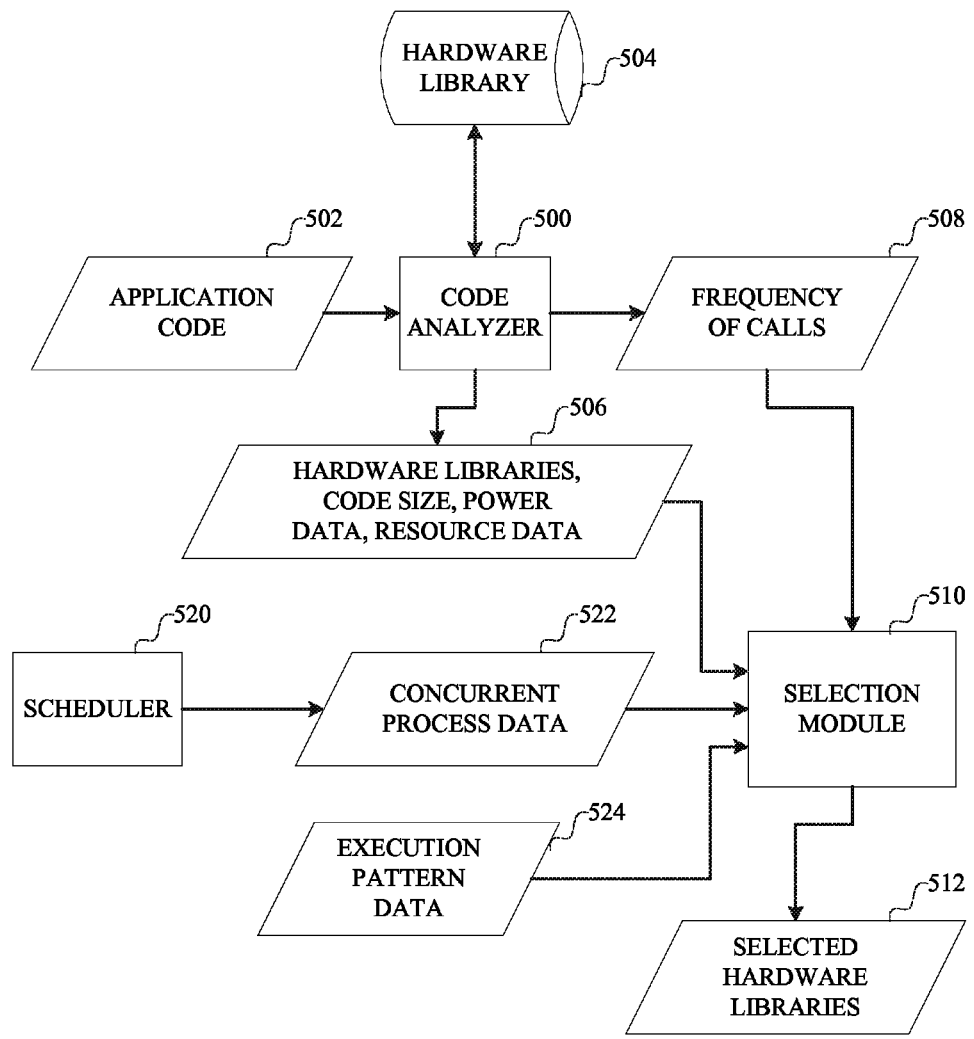
FIG. 5 is a data flow diagram of an example implementation of code analysis and library selection for system such as in FIG. 1.

Referring now to FIG. 5, a code analyzer 500 receives the application code 502. The code analyzer also has access to the hardware library 504 (or at least an index for the hardware library) to identify available hardware libraries. The code analyzer identifies hardware libraries 506 that are available to implement various functions within the application code 502. The information about the hardware libraries 506 that can be provided includes, but is not limited to, code size, power consumption data, resource data (indicating which slices of the FPGA are used), etc. The code analyzer 500 also can output information 508 about the frequency of calls made to such a hardware library.

A selection module 510 receives the information 506 about the hardware libraries and the information 508 about the calls made the libraries, to make a selection about which hardware libraries are to be used. The selection module also can receive data 522 from a scheduler 520, for example about other concurrent processes, to assist in this selection. Other data about the execution pattern 524 from prior executions of the application code 502 also can be used to assist in this selection. Given the input information, the selection module provides an output 512 indicating the hardware libraries that have been selected to assist in accelerating processing by the application code 502.

The code analyzer can be implemented in any of a variety of conventional ways for identifying calls to a library. In this case, the calls are being made to a library with a hardware implementation. In one example, the code analyzer searches the application code for references to functions or objects having implementations in the hardware library, and outputs information about those hardware libraries. In another example, the code analyzer identifies traps into the operating system, which denote system calls. If operating system functionality has been offloaded onto an FPGA, the traps can be redirected to different code paths within the operating system by rewriting the registers used to pass data into the kernel with hints or appropriate data for a call to an FPGA.

Figure 6:
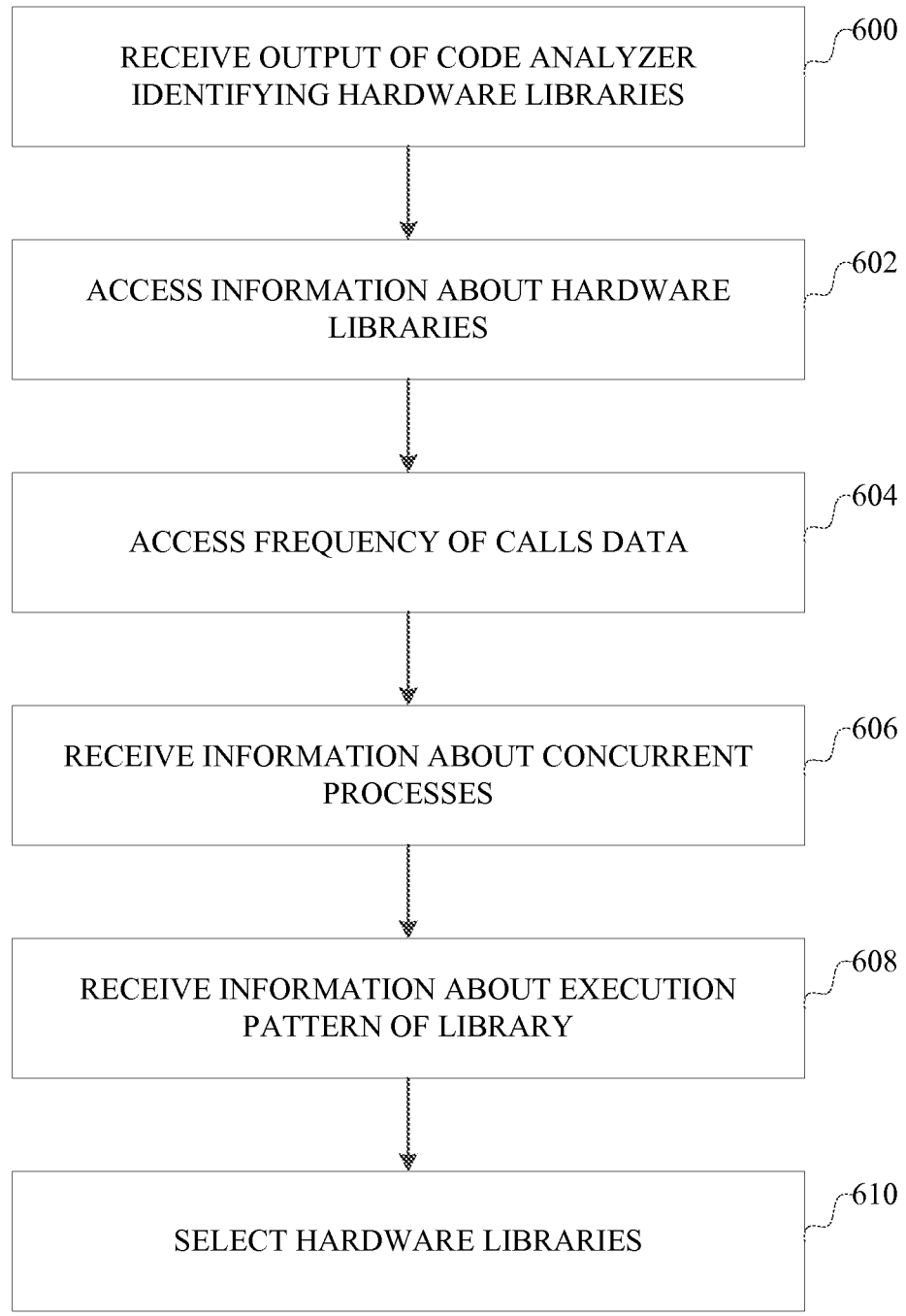
FIG. 6 is a flow chart describing an example implementation of a selection module in FIG. 5.

A flowchart for an example implementation of the selection module will now be described in connection with FIG. 6. After receiving 600 the output of the code analyzer, identifying the available hardware libraries, the selection module accesses 602 information about the hardware libraries, such as the code size, power consumption, FPGA resource consumption and the like. Information about the frequency of calls to this library in the code is received 604. If there are concurrent processes using the FPGA, this information also is received 606. Finally, information about the execution pattern of the application code (including the number of times the library has been invoked in prior executions of the application code) is received 608. Using the variety of received information, one or more of the available hardware libraries can be selected 610.

Any specific process to implement such selection is dependent on the application and type of FPGA resources being used. In the simplest case, the hardware libraries can be selected for use if there are no conflicts with other processes in using the FPGA resources, and if the projected utilization of the FPGA resources is estimated to provide better acceleration of the application than if a software library were used instead.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

The invention claimed is:

1. A computer-implemented process, the process comprising:

receiving, into memory, computer program code including references to one or more libraries;

accessing, with a computer processor, information about available hardware libraries;

determining, with a computer processor, whether the references in the computer program code can be implemented using one or more of the available hardware libraries;

generating a profile of the computer program code to predict functionality suited for execution on a field programmable gate array (FPGA) based at least in part upon the references to one or more libraries and information about the available hardware libraries including code size, power consumption data, resource data, and information about the frequency of calls made to the available hardware libraries;

receiving information from a scheduler including each of the computer program code performance requirements, priority of the computer program code execution, availability of a corresponding software library if a particular functional unit is not available within the FPGA, and context switching costs, and receiving data about an execution pattern from a prior execution of the computer program code; and based at least in part upon the generated profile, the information received from the scheduler and the received data, selecting and loading one or more of the one or more of the available hardware libraries into the FPGA for access by an application using the computer program code.

2. The computer-implemented process of claim 1, wherein the selecting includes determining whether resources in the FPGA are available for execution of the one or more of the available hardware libraries.

3. The computer-implemented process of claim 1, wherein the selecting includes considering access to the field programmable gate array by concurrent processes.

4. The computer-implemented process of claim 1, wherein the selecting includes considering resource usage of the one or more of the available hardware libraries in the field programmable gate array.

5. The computer-implemented process of claim 1, wherein the determining and the selecting occur as part of a just-in-time compilation process prior to executing the computer program code.

6. The computer-implemented process of claim 1, wherein the determining and the selecting occur at compile time.

7. A system comprising:
one or more computer processors;
one or more computer readable hardware storage devices;
computer-executable instructions stored on the one or more computer readable hardware storage devices that, when processed by the one or more computer processors, cause the system to perform a computer-implemented process comprising:

receiving, into memory, computer program code including references to one or more libraries;

accessing, with a computer processor, information about available hardware libraries;

determining, with a computer processor, whether the references in the computer program code can be implemented using one or more of the available hardware libraries;

generating a profile of the computer program code to predict functionality suited for execution on a field programmable gate array (FPGA) based at least in part upon the references to one or more libraries and information about the available hardware libraries including code size, power consumption data, resource data, and information about the frequency of calls made to the available hardware libraries;

receiving information from a scheduler including each of the computer program code performance requirements, priority of the computer program code execution, availability of a corresponding software library if a particular functional unit is not available within the FPGA, and context switching costs, and receiving data about an execution pattern from a prior execution of the computer program code; and based at least in part upon the generated profile, the information received from the scheduler and the received data, selecting and loading one or more of the one or more of the available hardware libraries into the FPGA for access by an application using the computer program code.

8. The system of claim 7, wherein the selecting includes determining whether resources in the field programmable gate array are available for execution of the one or more of the available hardware libraries.

9. The system of claim 7, wherein the selecting includes considering access to the field programmable gate array by concurrent processes.

10. The system of claim 7, wherein the selecting includes considering resource usage of the one or more of the available hardware libraries in the field programmable gate array.

11. The system of claim 7, wherein the determining and the selecting occur as part of a just-in-time compilation process prior to executing the computer program code.

12. The system of claim 7, wherein the determining and the selecting occur at compile time.

* * * * *